United States Patent
Moyer et al.

(10) Patent No.: US 7,124,281 B1
(45) Date of Patent: Oct. 17, 2006

(54) PROCESSING SYSTEM HAVING SEQUENTIAL ADDRESS INDICATOR SIGNALS

(75) Inventors: William C. Moyer, Dripping Springs, TX (US); Jeffrey W. Scott, Austin, TX (US); Brett W. Murdock, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 532 days.

(21) Appl. No.: 09/667,122

(22) Filed: Sep. 21, 2000

(51) Int. Cl.
*G06F 9/00* (2006.01)
(52) U.S. Cl. .................................................. 712/205
(58) Field of Classification Search ................ 712/205; 711/213, 217, 218
See application file for complete search history.

(56) References Cited

U.S. PATENT DOCUMENTS

| | | | | |
|---|---|---|---|---|
| 4,541,045 A | * | 9/1985 | Kromer, III | 712/205 |
| 5,594,765 A | * | 1/1997 | Oh | 377/44 |
| 5,604,877 A | * | 2/1997 | Hoyt et al. | 712/243 |
| 5,809,549 A | * | 9/1998 | Thome et al. | 711/167 |
| 5,826,108 A | * | 10/1998 | Sonobe | 710/35 |
| 5,835,969 A | * | 11/1998 | Inagaki et al. | 711/217 |
| 6,151,662 A | * | 11/2000 | Christie et al. | 711/145 |
| 6,205,536 B1 | * | 3/2001 | Yoshida | 712/38 |
| 6,275,926 B1 | * | 8/2001 | Samra | 712/210 |

OTHER PUBLICATIONS

Hennessy and Patterson, "Computer Architecture—A Quantitative Approach, 2nd Edition," 1996, pp. 127, 132, 134, 163, 262-264, and 275.*
Hennessy and Patterson, "Computer Architecture—A Quantitative Approach, 2nd Edition," 1996, pp. 271-273.*

* cited by examiner

*Primary Examiner*—Eddie Chan
*Assistant Examiner*—David J. Huisman
(74) *Attorney, Agent, or Firm*—Joanna G. Chiu; James L. Clingan, Jr.

(57) ABSTRACT

Embodiments of the present inventions relate to processors having sequential address indicator signals, also referred to as sequence signals, for indicating when accessed addresses are sequential. One embodiment relates to a processing system for accessing memory having an address bus for providing a current address and a previous address to memory, a data bus, an execution unit, and a decode control unit. The processing system further includes a fetch unit, coupled to the execution unit, the decode control unit, the address bus, and the data bus, for generating a first sequence signal that when negated indicates that the current address may not be sequential to the previous address, a second sequence signal that when negated indicates that the current address is not sequential to the previous address, and a third sequence signal that when negated indicates that the current address, if it is an instruction address, is not sequential to the previous address that was an instruction address.

21 Claims, 6 Drawing Sheets

PROCESSING SYSTEM HAVING SEQUENTIAL ADDRESS INDICATOR SIGNALS

FIELD OF THE INVENTION

The present invention relates to processing systems, and more particularly, to processing systems having sequential address indicator signals.

RELATED ART

Many data processing systems include memories capable of burst mode operation. These burst mode memory devices are capable of providing greater throughput and reduced latency as compared to non-burst capable devices. Utilization of burst operation relies on the fact that successive memory accesses are to sequential locations in the device for sequential burst mode protocols. After an initial latency for the first data item, subsequent burst mode accesses are completed in a shorter period of time. Interruptions caused by events such as a change of flow or interleaved instruction and data accesses cause a break in burst mode operation, thus degrading memory performance since a new initial latency access is incurred at each break.

Furthermore, different burst mode memory devices within a data processing system may require different timing constraints to operate efficiently in burst mode. Therefore, a need exists for a data processor capable of providing sequential address indicator signals with varying accuracy and protocols to allow for improved performance of the various burst mode memory devices within the data processing system. A need also exists for sequential address indicator signals that allow devices to reduce the amount of breaks and interruptions of burst mode operations.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status. The terms "assert" and "negate" is used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Furthermore, an asterix (*) following the signal name is used to indicate an active low signal (meaning its logically true state is a logic level zero).

Embodiments of the present inventions provide for a processor capable of outputting burst indicator signals, which may also be referred to as sequential address indicator signals or as sequence signals. These signals allow for a trade off between longer setup times required by some memory devices by providing less accurate burst indicator signals, and shorter setup time requirements for other types of memory devices which can then be provided more accurate burst indicator signals. For example, one memory coupled to a processor may require a longer setup time to enter or exit burst mode operation, and must therefore receive a burst indicator to control burst mode early in a clock cycle. However, since this indicator is required sooner, the signal may be less accurate, i.e. speculative. Alternatively, other memories coupled to the processor may not require as long a setup time and can afford to receive a burst indicator signal later in the clock cycle. In this case, the signal may be a fully accurate signal since the time can be taken to fully resolve the factors which the signal depends on. One data processor may be coupled to a plurality of memories capable of operating in these different modes, and therefore, each memory can be designed to use a burst indicator signal that is more tailored to its timing needs in order to take advantage of its burst mode operations. The use of burst indicator signals can be better understood in reference to the following description.

Figure 1:
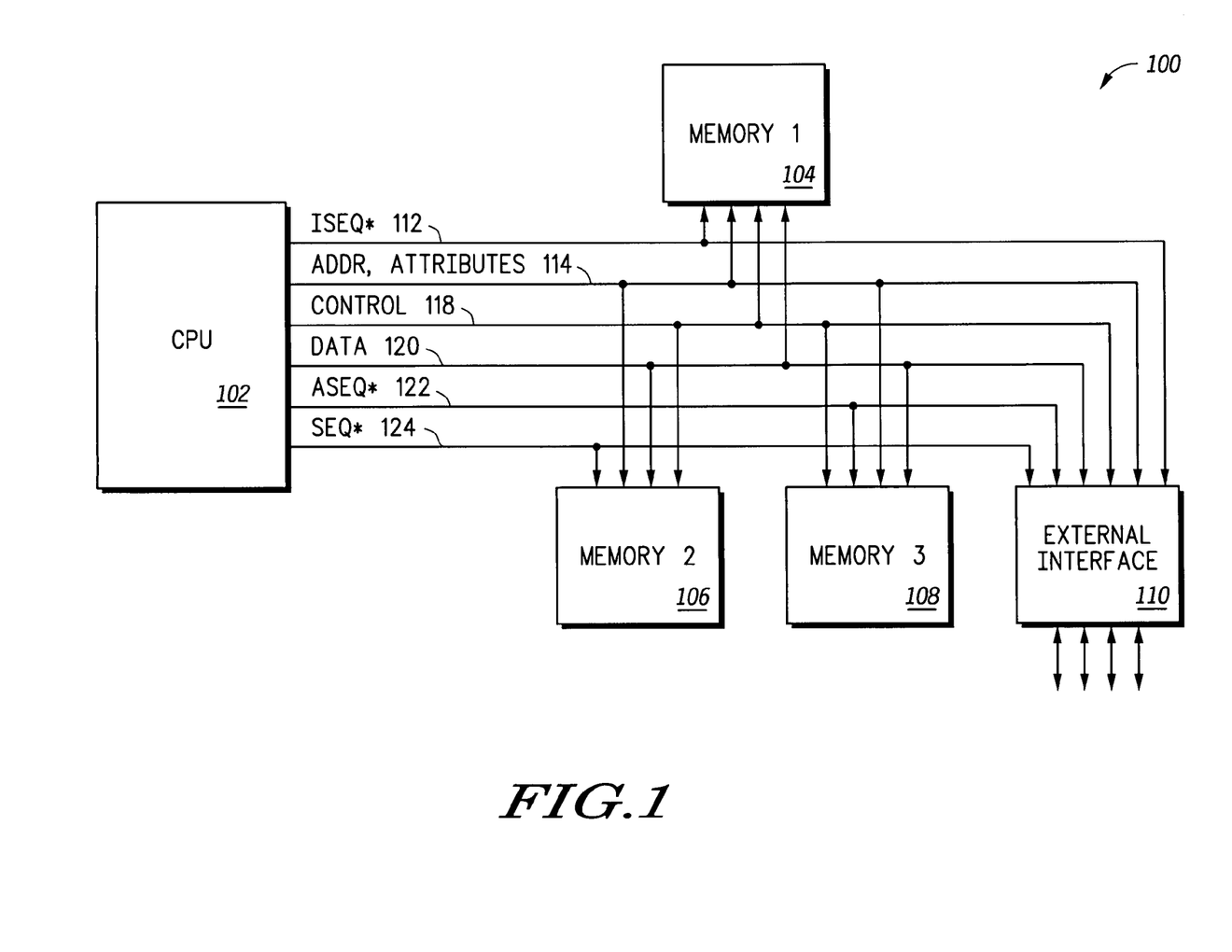
FIG. 1 illustrates, in block diagram form, a data processing system in accordance with one embodiment of the present invention.

FIG. 1 illustrates a data processing system 100 in accordance with one embodiment of the present invention. Central processing unit (CPU) 102 is coupled to memory 1 104, memory 2 106, memory 3 108, and external interface 110. CPU 102 provides signal ISEQ*112 to memory 104, address and attributes bus 114 to memory 1 104, memory 2 106, and memory 3 108. Control signals 118 are coupled between CPU 102 and memory 1 104, memory 2 106, and memory 3 108. Likewise, data 120 is also coupled between memory 1 104, memory 2 106, and memory 3 108. Also, CPU 102 provides signal ASEQ*122 to memory 3 108, and provides SEQ*124 to memory 2 106. External interface 110 also receives each of these above mentioned signals and provides the proper interface to any external devices coupled to data processing system 100 as appropriate. Each of the memories, such as memory 1 104, memory 2 106, and memory 3 108, can be any appropriate memory required within data process system 100. For example, each memory device may be a flash memory, a DRAM memory, an SRAM memory, a cache, or any other appropriate memory device. Therefore, data processing system 100 may include different types of memory devices. Also, memory devices 104, 106, and 108 may be embedded in the same integrated circuit as CPU 102 or may be separate devices. Operation of data processing system 100 will further be described in references to FIGS. 2–5 below.

Figure 2:
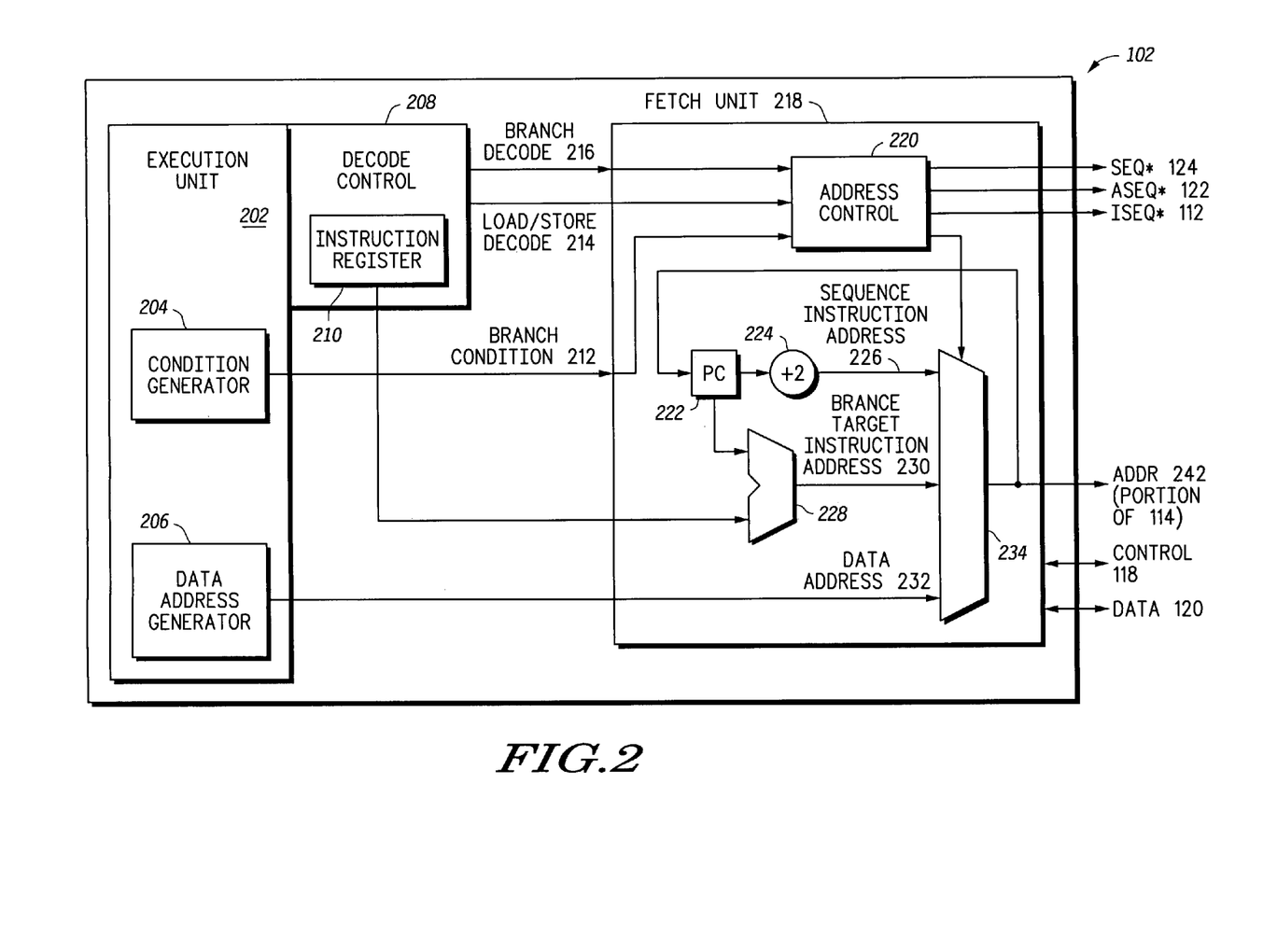
FIG. 2 illustrates, in block diagram form, a central processing unit in accordance with one embodiment of the present invention.

FIG. 2 illustrates one embodiment of CPU 102 of FIG. 1. In the illustrated embodiment, CPU 102 is a pipelined processor. CPU 102 includes execution unit 202, decode control unit 208, and fetch unit 218. Execution unit 202 includes condition generator 204 and data address generator 206. Condition generator 204 provides to fetch unit 218 the branch condition signal 212, which may indicate the state of the condition code used by a branch instruction currently being executed to determine whether the branch is to be taken or not taken in the case of a conditional branch instruction. Data address generator 206 provides data address 232 to fetch unit 218. Decode control 208 includes instruction register 210 which provides the displacement to be added to the program counter (PC) upon a change of flow instruction, such as a branch instruction, to fetch unit 218. Decode control 208 also provides branch decode 216 and load/store decode signal 214 to fetch unit 218. Branch decode signal 216 indicates when a branch instruction is being decoded while load/store decode signal 214 indicates when a load/store instruction (which corresponds to a data fetch) is being decoded.

Fetch unit 218 includes address control 220 which receives branch decode 216, load/store decode 214 and branch condition 212 and generates a plurality of sequential address indicator signals (such as SEQ*__124__, ASEQ*__122__, and ISEQ*__112__) and a control signal for multiplexer (MUX) 234. MUX 234, also included within fetch unit 218, receives three address signals: sequential instruction address 226, branch target instruction address 230, and data address 232, and based on the control signal received from address control 220, provides one of these three addresses to address 242 which is a portion of address and attribute bus 114 of FIG. 1. The output of MUX 234 is also provided to program counter (PC) 222 which is subsequently incremented by two by adder 224 to provide a next sequential address 226 to MUX 234. Adder 228 receives one input from PC 222 and another input from instruction register 210 in order to calculate the branch target instruction address 230 which is provided to MUX 234. Therefore, adder 228 adds the displacement received from instruction register 210 to the current PC to obtain branch target instruction address 230. Fetch unit 218 also provides and receives a plurality of control signals 118 and data 120.

In operation, CPU 102 allows a tradeoff between those external devices requiring longer setup times and receiving an early, but less accurate sequential address indicator signal, and those external devices requiring less setup time and receiving a later but more accurate sequential address indicator signal. Signal SEQ*__124__ for example, assumes a worse case scenario. This signal is provided early in the clock cycle where a branch instruction is decoded (due to the possible change of flow in the next cycle). Since the possibility of accessing a non-sequential address in the next cycle exists, SEQ* 124 is negated to interrupt the current burst access. Signal SEQ* 124 is provided early in the clock cycle prior to the resolution of the conditional branch and therefore will be negated when the decode of a branch is detected, regardless of whether the branch is taken or not. If the branch is resolved as not taken, the following instruction accesses would be sequential to the branch instruction. In this case, SEQ* 124 is later reasserted to reinitiate a burst mode access; however, a penalty will be incurred by a memory device utilizing SEQ* 124 as its burst indicator signal since additional latency is required to reinitiate a burst mode access. Thus SEQ* 124 is provided to those memory devices that require a longer setup time (to end the current burst access) and need SEQ* 124 or any burst indicator signal as early in the clock cycle as possible. For example, this early indicator allows for a row precharge or other memory recovery cycle to be initiated early.

On the other hand, ASEQ* 122 is provided later in the clock cycle as compared to SEQ* 124 because it waits until the branch condition is resolved to be either taken or not taken, thus cannot be driven valid as early as SEQ* 124. Therefore, ASEQ* 122 provides an accurate burst indicator signal. However, since it is provided late in the clock cycle, only those memory devices that require a shorter setup time may utilize this signal. This is because the memory device requires only a short amount of time to set up for initiating or ending a burst mode access.

ISEQ*__112__ is asserted during a series of sequential instruction fetches from an instruction memory. If these serial instruction fetches are interrupted by intervening data accesses to another device (other than the memory device providing the instructions), ISEQ* 112 may be provided to the instruction memory so that once the data fetches are complete, the instruction memory can continue its previous burst mode access without having to reinitiate a new burst mode access. ISEQ* 112, similar to ASEQ* 122, is also an accurate signal. That is, once ISEQ* 112 is negated, it is guaranteed that the next instruction access is not sequential, unlike SEQ* 124 which provides only a guess as to whether the next instruction will be sequential or not.

Therefore, signals ISEQ* 112, SEQ* 124 and ASEQ* 122 are provided as burst indicator signals and are dependent upon such events as changes of flow (i.e. branches), data fetches, and instruction fetches. Different memory devices having different timing requirements may then utilize whichever burst indicator signal (or signals) that provides for better performance. These signals will be better understood in reference to the sample program flow below. In this sample flow, the addresses listed on the left are those that are sent out on the address and attribute bus 114. The address may be an instruction address (meaning an instruction is stored at the given address location) or a data address (meaning data is stored at the given address location). Note also that the addresses are given and referred to in base 16 (hex) format.

| | |
|---|---|
| 1000 | add |
| 1002 | load 2000 |
| 1004 | sub |
| 2000 | DATA |
| 1006 | cmp |
| 1008 | beq 1030 |
| 100A | mul |
| 1030 | or |
| 1032 | cmp |
| 1034 | beq 1050 |
| 1036 | and |
| 1038 | xor |
| 103A | not |

As seen above, the instruction at address 1002 is fetched subsequent to the instruction at address 1000, and signals ASEQ* 122, SEQ* 124, and ISEQ* 112 are all asserted prior to the fetch to indicate that address 1002 is a sequential access with respect to address 1000. Therefore, burst mode may be enabled by the memory device providing the instructions from sequential address 1002 and may continue for instruction address 1004 as well since it is sequential to instruction address 1002. However, at address 1002, the instruction "load 2000" is encountered. Execution of this "load 2000" fetches data from address location 2000. Therefore, when this instruction enters the execute stage of the pipeline, address 2000 is sent on the address attribute bus 114 in order to fetch data stored at that location from the appropriate memory or device. At this point, ASEQ* 122 and SEQ* 124 are both negated for the data fetch and remain negated for the instruction fetch following the data fetch from address 2000. However, ISEQ* 112 is not negated during this intervening data access. In this manner, upon completing the data fetch, the memory device providing the instructions may continue its burst access without having to reinitiate a new burst (or sequential) access. This provides the ability for the memory device providing the instructions to not interrupt its current burst access and therefore reduce any latency required in reinitiating new burst accesses.

Upon completing the data fetch, the next instruction is fetched at address 1006. ISEQ* 112 is asserted for this instruction fetch to indicate that it is sequential to the previously fetched instruction (prior to data access) at address 1004. SEQ* 124 and ASEQ* 122 remain negated for this fetch from address 1006, since it is not sequential to data access address 2000. The following instruction is fetched from address 1008 which is sequential to address 1006, therefore, both ASEQ* 122 and SEQ* 124 are again asserted to indicate that the current address 1008 is sequential to the previous address 1006. ISEQ* 112 remains asserted as well. The instruction fetched from address 1008 is a branch instruction which could indicate a change of flow if this branch is taken. Since the following instruction may either be sequential at address 100A if the branch is not taken or not sequential at address 1030 if the branch is taken, SEQ* 124 is negated as soon as the branch enters the decode stage of the pipeline. This timing aspect will be further explained in reference to the timing diagrams in FIGS. 3–5 below. ASEQ* 122, on the other hand, will remain asserted until the branch condition is resolved. Therefore, assuming the branch is taken (meaning the next instruction fetch will occur from address 1030, which is not sequential to the current address), SEQ* 124 will remain negated, and ASEQ* 122 will be negated later in the clock cycle, after the branch condition is resolved. Note that in the pipeline, instruction address 100A has already been fetched; therefore, this instruction will be discarded since the next instruction needed is at address 1030.

Once again, since address 1030 is not sequential to address 1008, ASEQ* 122, SEQ* 124, and ISEQ* 112 are all negated. Note that since the instruction fetch is not sequential, ISEQ* 112 must also be negated. The next instruction is fetched from address 1032 which is sequential to address 1030. Therefore, at this point, all three signals ISEQ* 112, SEQ* 124, and ASEQ* 122 are once again asserted to provide burst indicators to the appropriate memories. However, SEQ* 124 will be asserted earlier in the clock cycle as compared to the accurate signals ASEQ* 122 and ISEQ* 112. Sequential instruction accesses are continued at addresses 1032, 1034, and 1036.

At address 1034, another branch instruction is encountered. When this branch instruction enters the decode stage of the pipeline, SEQ* 124 is once again negated early in the cycle to provide a burst indicator to those memories that require a longer setup time for exiting burst mode and therefore need the burst indicator signal earlier. ASEQ* 122 remains asserted until the branch condition is actually resolved. In this example, it is assumed that the branch is not taken (meaning that the following instruction to be fetched is sequential), and thus ASEQ* 122 remains asserted for the fetch of address 1038. SEQ* 124 is negated for this fetch of address 1038 since it was required to be valid prior to the resolution of the branch outcome, thereby requiring a new burst access to be initiated. This new burst access incurs additional latency since the burst access was interrupted at this branch instruction. In comparison, the accurate sequential burst indicator ASEQ* 122 remains asserted because the branch is resolved as not taken; therefore, those memory devices not requiring the earlier set up time and able to wait until the branch is resolved, are able to continue the burst access without interruption. This results in reduced latency and improved burst mode operation. Instruction fetches then continue with address 1038 and 103A. Following the fetch from address 1038, ASEQ* 122 remains asserted for the fetch from the next instruction address 103A, and SEQ* 124 reasserts for this fetch since it is sequential to the prior fetch of 1038, and burst mode operation resumes. Therefore, as was described above, ISEQ* 112, SEQ* 124, and ASEQ* 122 provide a variety of different signals which provide different burst indications with varying accuracy and timing protocols to the memory devices. In summary, the following table illustrates how these three signals (SEQ* 124, ASEQ* 122, and ISEQ* 112) are generated when certain actions are encountered.

|  | SEQ* | ASEQ* | ISEQ* |
| --- | --- | --- | --- |
| Branch Taken | N | N | N |
| Data Fetch | (N) N | (N) N | (X) A |
| Sequential Instruction Fetch | A | A | A |
| Branch NOT Taken | N | A | A |

In the table above, "N" refers to the signal being negated, "A" refers to the signal being asserted, and "X" refers to the signal being a don't care. In the row labeled Data Fetch, there is an extra state of the signal given in parentheses. This state within the parenthesis indicates the state of the signal during the data fetch itself. The other state in this row refers to operation of the signal on the subsequent instruction fetch following the data access. Therefore, during the data fetch, SEQ* 124 and ASEQ* 122 remain negated, while the state of ISEQ* 112 may be either asserted, negated, or indeterminate. During the data fetch, ISEQ* 112 may be in any state, but it should be asserted at some point prior to the next instruction fetch so that the memory providing instructions may continue its burst access without having to reinitiate a new burst access. Also, note that for the Branch NOT Taken, ASEQ* 122 and ISEQ* 112 remain asserted since they are accurate signals provided after the branch condition is resolved, while SEQ* 124, a speculative signal, is negated regardless of whether the branch is take or not.

In the case where the data access is performed to the memory device which normally supplies instructions, ISEQ* 112 must be ignored by the memory device for the access, and the burst in progress is interrupted in order to fulfill the data access. Following the data access, the memory device utilizing ISEQ* 112 will cause a burst cycle to be reinitiated for the following instruction fetches. In most systems, this case is infrequent, and the memory device utilizing ISEQ* 112 will rarely be accessed for data, thus burst interruption will normally only occur for true instruction change-of-flow conditions.

Although the example program discussed above only referred to a single data fetch initiated by the "load 2000" instruction at address 1002, alternate embodiments may provide multiple data fetches in a row. For example, load multiple or store multiple instructions may require more than a single data fetch. In this case, during the first data fetch cycle, ASEQ* 122 and SEQ* 124 are negated, as described above. However, if the subsequent data fetch (for example, at address 2002) is sequential to the current data fetch, then ASEQ* 122 and SEQ* 124 may once again be asserted to indicate sequential data accesses. Therefore, the memory providing the data may initiate a burst mode access. During all data fetch cycles, though, ISEQ* 112 may remain either asserted, negated, or indeterminate, so long as it is asserted prior to the next instruction fetch, which, in the above example, occurs at address 1006.

Figure 3:
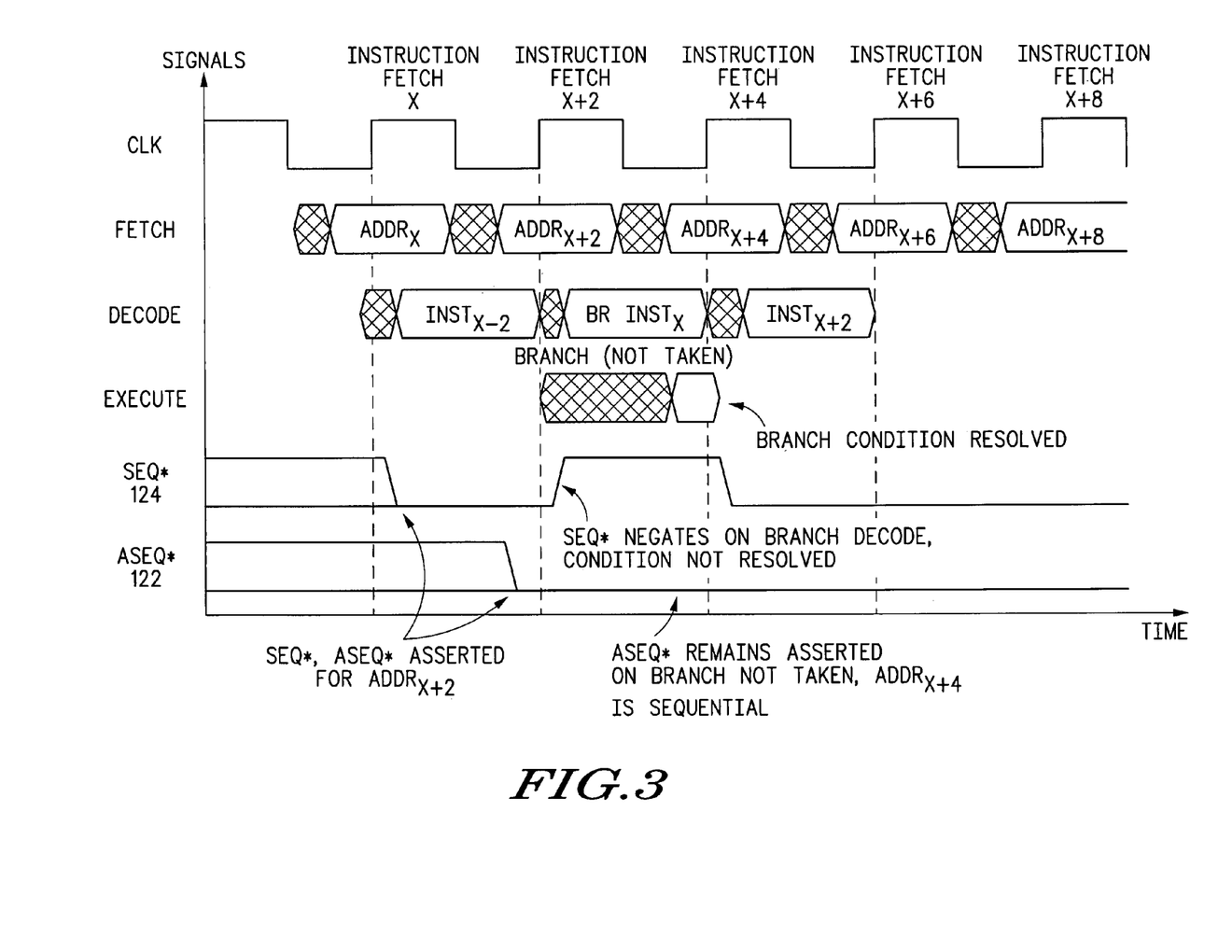
FIGS. 3–6 illustrate timing diagrams of various signals within a data processing system in accordance with various embodiments of the present invention.

FIG. 3 illustrates an example of the operation of the SEQ* 124 and ASEQ* 122 signals in one embodiment of the present invention. This timing diagram also illustrates the timing aspects of these two signals. In this example, a conditional branch instruction is located at address X, and the conditional branch will not be taken in this instruction flow. The timing diagram of FIG. 3 illustrates the clock signal, the fetch, decode, and execute stages of the pipeline, SEQ* 124, and ASEQ* 122. During a first clock, the instruction at address X is fetched which is illustrated by the "Instruction Fetch X" label above the clock signal as well as the "ADDR$_X$" in the fetch stage shown. While address X is in the fetch stage, the previous instruction located at address X−2 has entered the decode stage as illustrated by the "INST$_{X-2}$" in FIG. 3. During this first cycle, SEQ* 124 and ASEQ* 122 are asserted for the upcoming fetch from address X+2, indicating that X+2 is sequential to address X. However, note that SEQ* 124 is asserted early in the cycle as compared to ASEQ* 122, which is asserted later in the cycle. These signals are asserted in response to the state of the pipeline during the cycle to indicate that sequential addresses are being accessed. For example, if the previous instruction at address X−2 was not a branch instruction and address X and address X+2 are also instruction accesses, the state of the pipeline indicates that the central processing unit (e.g. CPU 102) is in a sequential access operating mode. Prior to SEQ* 124 and ASEQ* 122 being asserted, the signals are illustrated as being in an indeterminate state. That is, their state will depend upon the prior states of the pipeline prior to the point illustrated in the timing diagram of FIG. 3.

In the next cycle where the address X+2 is fetched (as illustrated by the "Instruction Fetch X+2" label above the clock signal), the instruction stored at X is decoded. In this example, the instruction stored at address X corresponds to a branch instruction ("BR INST$_X$") which is being decoded in this clock cycle. Note that since a branch instruction is detected, SEQ* 124 is negated immediately upon this branch decode prior to the branch condition being resolved, since the address following address X+2 has not yet been determined to be X+4 or the target location of the branch instruction. Therefore, this provides an earlier burst indicator to those memory devices requiring a longer setup time.

In this example, since the branch will not be taken, address X+4 will follow, and the memory device could continue in burst mode since sequential addresses will be fetched. However, the branch condition is not resolved until the end of the clock cycle which occurs after SEQ* 124 is negated. ASEQ* 122, on the other hand, is not updated until the branch condition is resolved. In FIG. 3, ASEQ* 122 remains asserted on this branch not taken since flow continues with a sequential access at addresse X+4. In this manner, the memory devices not requiring the earlier provided SEQ* 124 signal may rely on ASEQ* 122 as its burst or sequential address indicator. Since the branch is resolved as not taken, ASEQ* 122 remains asserted thus preventing that memory device from interrupting its burst access. Therefore, the memory device or devices relying on ASEQ* 122 may take advantage of continuing the burst access without having to reinitiate a new burst access as compared to those memory devices relying upon SEQ* 124.

As can be seen in FIG. 3, after the branch condition is resolved as not taken, address X+4 is fetched. However, in this clock cycle the burst access to the memory device utilizing SEQ* 124 must be reinitiated (since SEQ* 124 was negated on branch decode) which incurs delays and latencies in setting up the new burst access. In this clock cycle, the instruction stored at address location X+2 (which corresponds to the address following the branch instruction) is in the decode stage. Flow then continues to the fetch of address X+6 in the subsequent clock cycle, and then continues with sequential accesses.

Figure 4:
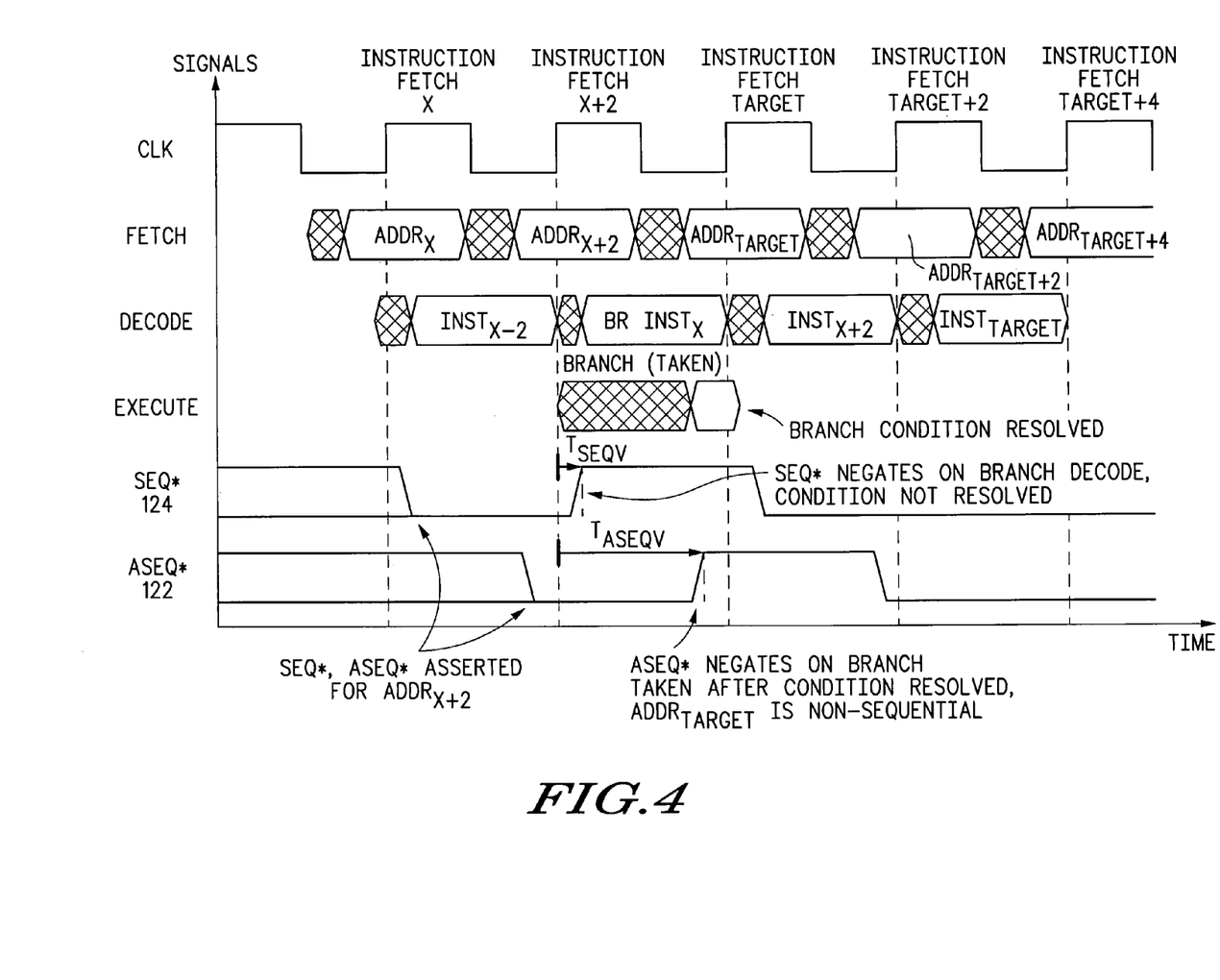

FIG. 4 also illustrates an example of the operation of the SEQ* and ASEQ* signals; however, in this example, the conditional branch instruction located at address X is taken. During a first clock cycle, address X is fetched as indicated by the label "Instruction Fetch X" above the first clock cycle. During the fetch of address X in this first clock cycle, the instruction at X−2 ("INST$_{X-2}$") is in the decode stage of the pipeline. During this same cycle, SEQ* 124 and ASEQ* 122 are both asserted in response to the current state of the pipeline to indicate that sequential address accesses are occurring, and the next access will be to address X+2. Note once again that SEQ* 124 is asserted early within the clock cycle while ASEQ* 122 is asserted later in the clock cycle as compared to SEQ* 124.

During the next clock cycle, the instruction at address X+2 is fetched and the instruction at address X enters the decode stage. In this example, the instruction located at address X is a branch instruction ("BR INST$_X$"). Therefore, SEQ* 124 is negated early in the cycle as soon as the branch instruction is detected. (As discussed above in reference to FIG. 2, the address control unit 220 receives branch decode 216 to know when a branch is being decoded. Alternate embodiments may use other mechanisms to identify branch instructions.) Therefore, SEQ* 124 is valid in a shorter time from the start of the clock cycle, labeled T$_{SEQV}$ in FIG. 4. However, once the branch condition is resolved late in the current clock cycle, ASEQ* 122 is negated since, in this example, the branch is taken (meaning that the following instruction fetch will not be sequential). In this case, the time until ASEQ* 122 is valid from the start of the cycle is longer than that of SEQ* 124. As can be seen on FIG. 4, T$_{ASEQV}$ is longer than T$_{SEQV}$. Therefore, due to the larger time required to become valid, ASEQ* 122 provides a branch indicator to its memory devices at a later time than SEQ* 124, since it based on the actual resolution of the branch condition, 212 by Condition Generator 204, not simply on the decode of a branch instruction (Branch Decode 216). Branch resolution requires more time, since the condition generation typically involves comparison of operands, and the comparison typically involves subtraction or other logical or arithmetic computations to occur. These require more delay than simply decoding the instruction to determine a branch instruction is present, thus Branch Condition 212 becomes valid later in the clock cycle than Branch Decode 216.

Since the branch is taken, both SEQ* 124 and ASEQ* 122 are negated by the third clock cycle at which point the instruction located at the target address is fetched and the instruction following the branch instruction located at address X+2 is being decoded. However, since the branch was taken, the instruction fetched from address X+2 is discarded, and in the following clock cycle, while the instruction following the target instruction ("ADDR$_{TARGET+2}$") is being fetched, the target instruction enters the decode stage. Flow then continues from the target address. Since the address following the target address is sequential, then once again SEQ* 124 and ASEQ* 122 are re-asserted for the fetch from address Target+2.

Therefore, in the example of FIG. 4, the SEQ* 124 interrupted the burst access operation as in the previous example; however, due to the branch being taken, a new burst access must be initiated since the address of the target instruction is not sequential to the branch instruction. Likewise ASEQ* 122 also interrupts the burst access prior to initiating a new burst access at the target instruction; however, ASEQ* 122 is provided later in the clock cycle than SEQ* 124. Therefore, memory devices may rely on either signal depending on its timing needs.

Figure 5:
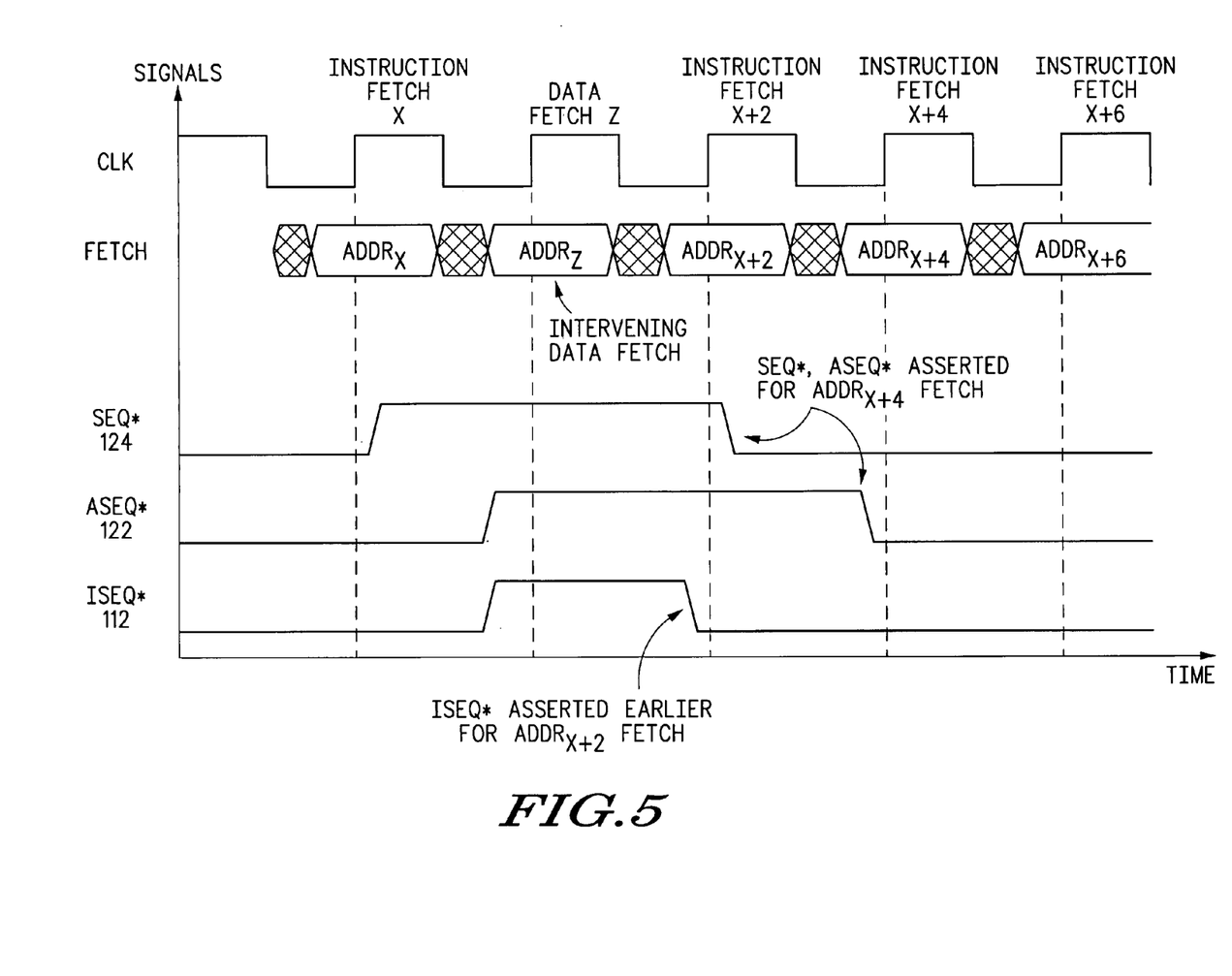

FIG. 5 illustrates a timing diagram that shows an example of the operation of SEQ* 124, ASEQ* 122, and ISEQ* 112 while fetching inline code interspersed with a data access. FIG. 5 illustrates the clock signal, the fetch stage of the pipeline, and SEQ* 124, ASEQ* 122, and ISEQ* 112. During a first clock cycle illustrated in FIG. 5 (labeled with "Instruction Fetch X") the instruction stored at address X is fetched. However, during the following clock cycle an intervening data fetch occurs. That is, data is fetched from address location Z. Since address Z is not sequential to the previous address X, SEQ* 124 and ASEQ* 122 are negated prior to the data fetch. In this example, it is assumed that the addresses prior to address X were sequential accesses fetching sequential instructions from a memory device. Therefore, ISEQ* 112 is shown in FIG. 5 as being asserted prior to the first clock cycle. However, when the fetch of the data located at address Z is initiated, ISEQ* 112 is negated. Alternate embodiments may either assert ISEQ* 112 or allow ISEQ* 112 to enter an indeterminate state. During a second clock cycle (labeled with "Data Fetch Z") and after initiation of the intervening data fetch, ISEQ* 112 is reasserted so that sequential instruction accesses may continue with the fetch of the instruction located at address X+2 (which is sequential to the previous instruction fetch from address X). Note that similar to ASEQ* 122, ISEQ* 112 is also an accurate signal and is therefore provided later in the clock cycle. Since address X+2 is not sequential to data address Z, both SEQ* 124 and ASEQ* 122 remain negated.

Therefore, upon entering the third clock cycle labeled by "Instruction Fetch X+2," the memory device utilizing ISEQ* 112 to provide the sequential instructions may continue its burst mode access without having to reinitiate a new burst mode access. This avoids incurring the extra latency involved in reinitiating a sequential (or burst) access. Once the instruction address X+2 fetch is in progress, SEQ* 124 and ASEQ* 122 are once again asserted for the upcoming sequential instruction fetch at address X+4. Therefore, it can be seen how the ISEQ* signal allows the memory device providing sequential instructions to temporarily pause its sequential access to allow intervening data fetches, so long as those intervening data fetches are performed from a device other than the memory device providing the sequential instructions.

Note that the example illustrated in FIG. 5 only illustrates a single intervening data fetch at address Z. However, alternate embodiments may include multiple intervening data fetches such as an address Z followed by address Z+2, etc. In this case, ISEQ* 112 would still remain either asserted, negated, or in an indeterminate state until the intervening data fetches are all completed prior to being reasserted. Furthermore, if the data fetch following the data fetch at address Z is sequential (e.g. at address Z+2), SEQ* 124 and ASEQ* 122 may be asserted to indicate that sequential accesses to the memory device providing the data are being performed. Therefore, this memory device can initiate a burst access to provide the sequential data.

Figure 6:
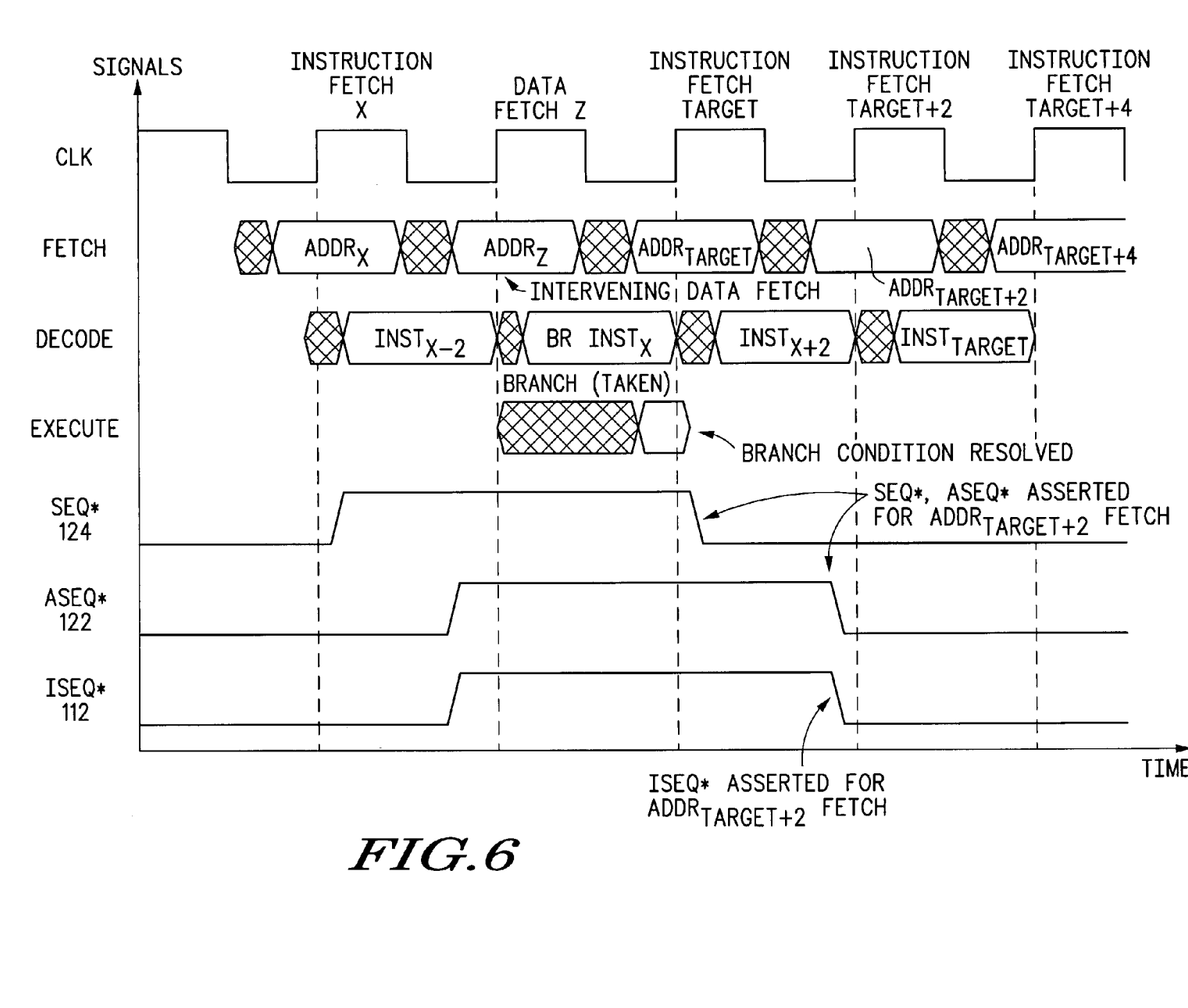

FIG. 6 illustrates a timing diagram that shows an example of the operation of SEQ* 124, ASEQ* 122, and ISEQ* 112 while executing a branch which is taken interspersed with a data access. FIG. 6 illustrates the clock signal, the fetch stage of the pipeline, and SEQ* 124, ASEQ* 122, and ISEQ* 112. During a first clock cycle illustrated in FIG. 6 (labeled with "Instruction Fetch X") the instruction stored at address X is fetched. In this case the instruction is a branch instruction which is taken, similar to the example shown in FIG. 4. In this example however, during a second clock cycle, an intervening data fetch occurs. That is, data is fetched from address location Z. Since address Z is not sequential to the previous address X, SEQ* 124 and ASEQ* 122 are negated prior to the data fetch. In this example, it is assumed that the addresses prior to address X were sequential accesses fetching sequential instructions from a memory device. Therefore, ISEQ* 112 is shown in FIG. 5 as being asserted prior to the first clock cycle. However, when the fetch of the data located at address Z is initiated, ISEQ* 112 is negated. Alternate embodiments may either assert ISEQ* 112 or allow ISEQ* 112 to enter an indeterminate state.

During a second clock cycle of FIG. 6 (following the first clock cycle), the branch instruction X enters the decode stage and the branch condition resolves to be taken. Following the data fetch from address Z, the target location of the branch ("ADDR$_{TARGET}$") is fetched. Since this address is not sequential to the data fetch from address Z, SEQ* 124 and ASEQ* 122 remain negated for the fetch from address ADDR$_{TARGET}$. In addition, ISEQ* 112 is negated for the fetch from ADDR$_{TARGET}$ since it is not a sequential fetch from the previous instruction access at address X. Due to the change in instruction flow, burst operation is interrupted and a new burst sequence must be initiated. Following the access to ADDR$_{TARGET}$, sequential instruction accesses may continue with the fetch of the instruction located at ADDR$_{TARGET+2}$, and SEQ* 124, ASEQ* 122, and ISEQ* 112 are asserted once again for the access to ADDR$_{TARGET+2}$.

It can be appreciated how a processor offering a variety of sequential address (or burst) indicator signals allows different memory devices to operate in accordance with their own timing specifications to better utilize their burst mode capabilities. Multiple memory devices may be coupled to a central processing unit such as CPU 102 where one memory device may require a longer setup time requiring an early burst indicator signal while a second memory device coupled to the same CPU might not require as long a setup time and can therefore wait upon an accurate burst indicator signal. Likewise, a memory device coupled primarily to provide instructions rather than data to CPU 102 may utilize the ISEQ* 112 in order to continue its burst mode accesses even while intervening data fetches occur to other devices. Therefore, a central processing unit such as CPU 102 provides flexibility in design and allows for a variety of external devices to be coupled to the CPU while achieving improved performance. A CPU providing any combination of the three sequential address indicator signals would allow for data processing systems to be designed having a variety of memory devices each having varying timing requirements.

In the foregoing specification, the invention has been described with reference to specific embodiments. However, one of ordinary skill in the art appreciates that various modifications and changes can be made without departing from the scope of the present invention as set forth in the claims below. For example, the signals described above may be implemented either as active high or active low signals. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A processing system for accessing memory, comprising:
   an address bus for providing a first address and a second address to memory, wherein the first address follows the second address on the address bus without any intervening addresses on the address bus;
   a data bus for receiving information from memory; and
   first means for generating a first sequence signal that when negated indicates that the first address may not be sequential to the second address, a second sequence signal that when negated indicates that the first address is not sequential to the second address, and a third sequence signal that when negated indicates that the first address, if it is an instruction address, is not sequential to an immediately preceding instruction address and when asserted indicates that the first address, if it is an instruction address, is sequential to the immediately preceding instruction address.

2. The processing unit of claim 1, wherein if the first address is not sequential to the second address, the first sequence signal is negated prior to the second sequence signal being negated.

3. The processing unit of claim 2, wherein the second sequence signal is negated in response to resolving a conditional branch.

4. The processing unit of claim 2, wherein if the first address is not sequential to the second address, the first and second sequence signals are negated during a same clock cycle.

5. The processing unit of claim 3, wherein if the first address is not sequential to the second address, the first and second sequence signals are negated during a same clock cycle.

6. A processing system for accessing memory, comprising;
   an address bus for providing a first address and a second address to memory, wherein the first address follows the second address on the address bus without any intervening addresses on the address bus;
   a data bus for receiving information from memory;
   an execution unit which generates branch conditions and data addresses;
   a decode control unit which decodes instructions; and
   a fetch unit, coupled to the execution unit, the decode control unit, the address bus, and the data bus, for generating a first sequence signal that when negated indicates that the first address may not be sequential to the second address, a second sequence signal that when negated indicates that the first address is not sequential to the second address, and a third sequence signal that when negated indicates that the first address, if it is an instruction address, is not sequential to an immediately preceding instruction address and when asserted indicates that the first address, if it is an instruction address, is sequential to the immediately preceding instruction address.

7. The processing system of claim 6, wherein the decode control unit comprises, an instruction register.

8. The processing system of claim 6, wherein if the first address is not sequential to the second address, the first sequence signal is negated prior to the second sequence signal being negated.

9. The processing system of claim 6, wherein the fetch unit comprises:
   an address control unit, coupled to the decode control unit and the execution unit, for receiving a branch condition signal from the execution unit and a branch decode signal and a load/store signal from the decode control unit and for providing the first, second, and third sequence signals.

10. The processing system of claim 9, wherein the execution unit comprises a condition generator that provides the branch condition signal.

11. The processing system of claim 10, wherein the execution unit comprises a data address generator which provides a data address signal to the fetch unit.

12. The processing system of claim 11, wherein if the first address is not sequential to the second address, the first sequence signal is negated prior to the second sequence signal being negated.

13. A processing system for fetching instructions and data, comprising;
   an address bus for providing a current address for retrieving a first instruction, the first instruction stored at the current address in an instruction memory, a previous address for retrieving a second instruction, the second instruction stored at the previous address in the instruction memory, and a data address for retrieving data, wherein the data address occurs before the current address and after the previous address, and wherein the current address follows the previous address without any intervening addresses for retrieving instructions;
   a data bus for retrieving the first and second instructions and the data; and
   a fetch unit, coupled to the address bus and the data bus, for generating a first sequence signal that when asserted for the current address indicates that the current address is sequential to the previous address and when negated indicates that the current address may not be sequential to the previous address, wherein the asserted or negated first sequence signal is provided with the current address for use by the instruction memory, and wherein when the address bus provides an address for retrieving data that is not an instruction, the first sequence signal is negated.

14. The processing system of claim 13, wherein the fetch unit comprises:
   an address control unit for receiving a branch condition, a branch decode signal, and a load/store signal and for providing the first sequence signal.

15. The processing system of claim 14, further comprising:
   an execution unit which provides the branch condition; and
   a decode control unit which provides the branch decode signal and the load/store signal.

16. A processing system comprising:
   an execution unit;
   a decode control unit;

a fetch unit, coupled to the execution unit and the decode control unit, for providing addresses on an address bus which may be sequential, and providing a first sequence signal and a second sequence signal for each address provided on the address bus wherein the first sequence signal indicates whether each address provided on the address bus may be sequential to an immediately preceding address on the bus and the second sequence signal indicates whether each address provided on the bus is sequential to the immediately preceding address on the bus, and wherein if the second sequence signal corresponding to one of the addresses indicates that the address is not sequential to the immediately preceding address, the first sequence signal corresponding to the address indicates that the address may not be sequential to the immediately preceding address prior to the second sequence signal indicating that the address is not sequential to the immediately preceding address, and the second sequence signal indicates that the address is not sequential to the immediately preceding address in response to resolving a conditional branch.

17. The processing system of claim 16, wherein if the second sequence signal indicates that an address is not sequential to the immediately preceding address, the first signal indicates that the address may not be sequential to the immediately preceding address in a same clock cycle as the second sequence signal indicating that the address is not sequential to the immediately preceding address.

18. The processing system of claim 16, wherein the addresses may be instruction addresses, and wherein the fetch unit further provides a third sequential signal which indicates whether each address that is an instruction address is sequential to a previous instruction address.

19. The processing unit of claim 18, wherein the execution unit comprises a condition generator that provides a branch condition signal to the fetch unit.

20. The processing unit of claim 19, wherein the decode control unit provides a branch decode signal and a load/store signal to the fetch unit.

21. A processing system for accessing memory, comprising;

an address bus for providing a first address and a second address to memory, wherein the first address follows the second address on the address bus without any intervening addresses on the address bus;

a data bus for receiving information from memory;

an execution unit which generates branch conditions and data addresses;

a decode control unit which decodes instructions; and a fetch unit, coupled to the execution unit, the decode control unit, the address bus, and the data bus, for generating a first sequence signal that when negated indicates that the first address may not be sequential to the second address, a second sequence signal that when negated indicates that the first address is not sequential to the second address, and a third sequence signal that when negated indicates that the first address, if it is an instruction address, is not sequential to a previous address that was an instruction address, wherein if the first address is not sequential to the second address, the first sequence signal is negated prior to the second sequence signal being negated and the first and second sequence signals are negated in a same clock cycle during which the first address is provided.

* * * * *